(12) United States Patent
Ciancimino et al.

(10) Patent No.: US 8,084,719 B2
(45) Date of Patent: Dec. 27, 2011

(54) VARIABLE HEAT DISTRIBUTION FOR INDOOR COOKING APPLIANCE

(75) Inventors: Rosario Ciancimino, Berrien Springs, MI (US); Julio C. Moreira, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 889 days.

(21) Appl. No.: 11/041,634

(22) Filed: Jan. 24, 2005

(65) Prior Publication Data

US 2006/0163242 A1    Jul. 27, 2006

(51) Int. Cl.
*H05B 3/68* (2006.01)
*H05B 3/02* (2006.01)

(52) U.S. Cl. .................... 219/450.1; 219/483

(58) Field of Classification Search .......... 219/443.1, 219/445.1, 446.1, 450.1, 460.1, 462.1, 483, 219/490, 123; 99/422, 444, 445
See application file for complete search history.

(56) References Cited

U.S. PATENT DOCUMENTS

| | | | |
|---|---|---|---|
| 3,172,997 A * | 3/1965 | Wetzel et. al. | 219/489 |
| 3,317,709 A * | 5/1967 | Beasley | 219/448.17 |
| 3,582,669 A | 6/1971 | Dempsey | 307/18 |
| 3,848,110 A * | 11/1974 | Giguere et al. | 219/525 |
| 4,313,052 A | 1/1982 | Fischer | 219/446 |
| 4,502,461 A * | 3/1985 | Keating | 126/39 K |
| 5,171,973 A | 12/1992 | Higgins | 219/464 |
| 5,355,779 A | 10/1994 | O'Brien et al. | 99/446 |
| 5,522,308 A | 6/1996 | Kayashima et al. | 99/331 |
| 5,524,528 A | 6/1996 | Yeh | 99/446 |
| 5,676,043 A | 10/1997 | Best | 99/331 |
| 5,742,031 A * | 4/1998 | Kelly et al. | 219/446.1 |
| 6,037,571 A | 3/2000 | Christopher | 219/450.1 |
| 6,064,042 A * | 5/2000 | Glucksman et al. | 219/452.13 |
| 6,437,291 B1 | 8/2002 | Hopponen | 219/395 |

* cited by examiner

*Primary Examiner* — Sang Paik
(74) *Attorney, Agent, or Firm* — Tara M. Hartman; Robert L. Judd (57) ABSTRACT

An electric cooking device with a cooking surface. The cooking surface includes a first heating element positioned under the cooking surface arranged to heat substantially the entire cooking surface to a first power density and a second heating element positioned under a portion the cooking surface arranged to heat approximately half of the cooking surface to a second power density. The second power density can be greater that the first power density. The electric cooking device can include a temperature regulator and a selector connected to the first heating element and the second heating element arranged to selectively connect the first heating element or the second heating element through the temperature regulator to a power source.

29 Claims, 6 Drawing Sheets

VARIABLE HEAT DISTRIBUTION FOR INDOOR COOKING APPLIANCE

BACKGROUND OF THE INVENTION

The invention relates to electric griddles and grills intended for indoor use in homes.

Indoor electric griddles and grills are useful for cooking a variety of foods. For example, indoor griddles are commonly used to cook breakfast foods. A common problem for these appliances is that given the relatively large surface area desired for cooking foods such as eggs and pancakes the power density, watts per surface area, is somewhat limited due to the limited power typically available for such appliances in residential homes. In the United States plug in electrical products for home use are typically limited to 1500 watts per electric outlet in order to be usable on 15 amp circuits found in many homes. In countries that have adopted 220 or 240 volt residential distribution the available power per electric outlet may be somewhat higher such as 2500 watts, but still limited. While the available power density is typically satisfactory for many types of foods requiring a slower cooking time (i.e. pancakes and eggs) the power density may not be sufficient for browning and crispy textures (i.e. hash browns, French toasts, bacon, meat patties, sausages, and steaks). One solution is to use gas-powered cooking appliances. However, portable gas powered griddles or grills are not typically used indoors in homes. Another solution is to reduce the surface area to increase the power density to provide satisfactory browning and quick cooking. Thus, for indoor electric griddles and grills intended for home use a trade off has been required between cooking area and power density.

SUMMARY OF THE INVENTION

The invention relates to an electric cooking device having a cooking surface. The cooking surface can include a first heating element arranged for heating the cooking surface and a second heating element arranged for heating a portion of the cooking surface. The cooking device can include a selector connected to the first heating element and the second heating element arranged to selectively connect the first heating element or the second heating element to a power source.

The first heating element can be arranged to heat the cooking surface to a first power density and the second heating element can be arranged to heat a portion of the cooking surface to a second power density.

The maximum power input to the cooking device when the second heating element is energized can be substantially the same as when the first heating element is energized.

The impedance of the first heating element and the impedance of the second heating element can be sized to allow operation of the electric cooking device connected to a normal household electric circuit.

In another aspect the invention relates to an electric griddle having a substantially flat rectangular aluminum cooking surface. The cooking surface can have a first heating element positioned under the cooking surface to heat substantially the entire cooking surface to a first power density and a second heating element positioned under a portion the cooking surface to heat approximately half of the cooking surface to a second power density. The second power density can be greater that the first power density. The electric griddle can include a temperature regulator and a selector connected to the first heating element and the second heating element arranged to selectively connect the first heating element or the second heating element through the temperature regulator to a power source.

In another aspect the invention relates to an electric cooking device having a cooking surface, a first means for heating the cooking surface to a first power density and a second means for heating a portion of the cooking surface to a second power density. The cooking device can include means for selectively energizing the first means or the second means. The second power density can be greater than the first power density.

DESCRIPTION OF THE INVENTION

Figure 1:
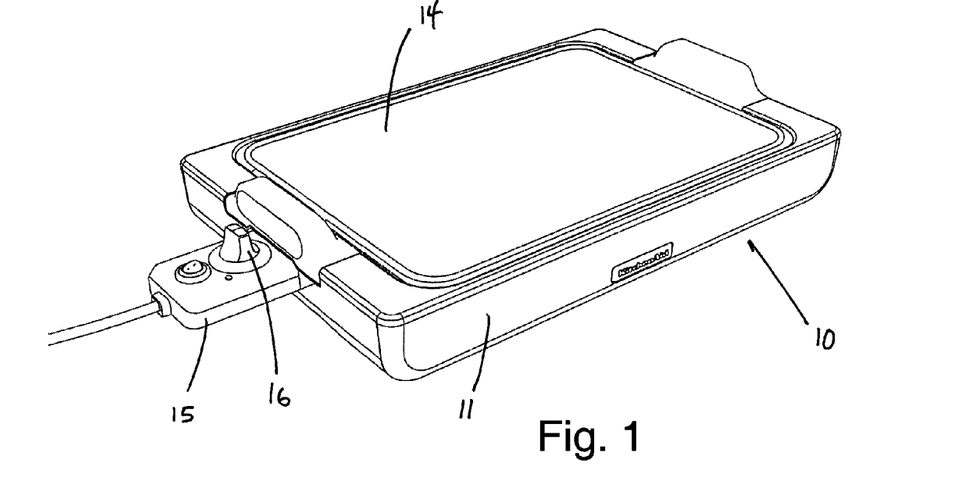
FIG. 1 is a perspective view of an electric cooking device according to the invention.

In a griddle or grill according the invention a user can change the heat distribution for the griddle or grill. According to the invention the full available power can be selectively applied the to full grill or griddle or to a portion of the grill or griddle. A user can select a higher power density for cooking foods that are typically browned and have crispy texture for a portion of the griddle or grill, and a lower power density for the entire griddle or grill. Thus, a user can have the benefit of high power density and a large cooking surface for an electric griddle or grill designed for home use indoors. The invention will first be described in an electric griddle embodiment, however, as will be described later, the invention can be employed in an electric grill as well. Turning to FIG. 1, an indoor electric griddle 10 can be seen. Griddle 10 can include a base 11 supporting a cooking surface 14. Cooking surface 14 can be cast metal such as die-cast aluminum. Those skilled in the art will understand that other metals can be used to form cooking surface 14. Base 11 can be formed of thermosetting plastic material or metal and can be arranged to support cooking surface 14 on a work surface in position for cooking foods with limited heat conduction to the work surface. Griddle 10 can include a temperature regulator 15 that can be arranged to plug into cooking surface 14 to connect the cooking surface heating element to a normal household electrical outlet (not shown). Temperature regulators for griddles and grills can be a detachable unit consisting of a temperature probe and an adjustable bi-metal thermostat with an ON/OFF control. Those skilled in the art will understand that temperature regulators for indoor griddles are typically detachable to facilitate cleaning cooking surface 14 in a sink or dishwasher. Temperature regulators typically can include a rotary control knob 16 to allow a user to adjust a thermostat and thereby the cooking temperature for the cooking surface as is well known in the art.

Figure 5:
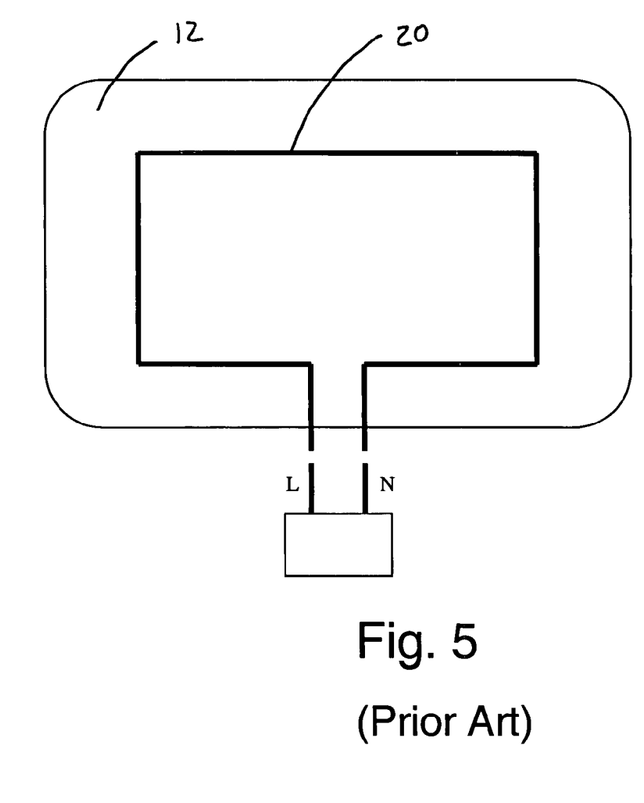
FIG. 5 is a schematic drawing illustrating the heating element of prior art cooking devices.

A typical arrangement of an electric heating element in prior art griddles is shown in schematic form in FIG. 5. A heating element 20 is typically arranged to provide relatively uniform heating to cooking surface 12. In electric griddles intended for the U.S. market heating element 20 is typically designed to provide 1500 watts of heat when connected to a 120-volt circuit in a home. Griddles intended for 220/240 volt markets can be designed to provide 2000-2500 watts when connected to a 220 or 240 circuit in a home as desired.

Figure 2:
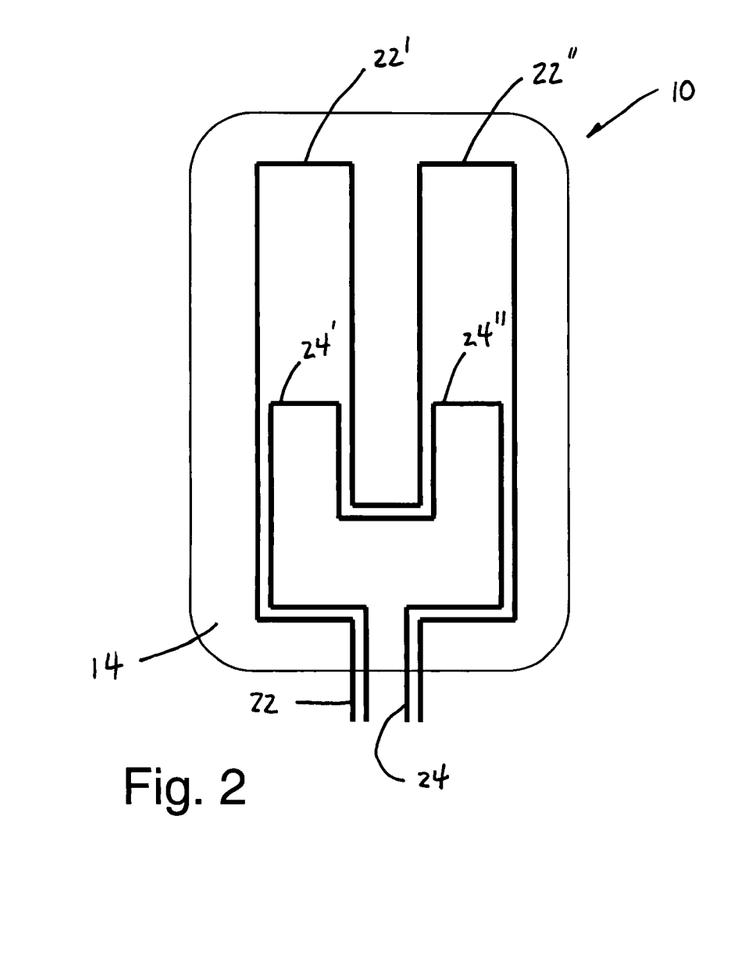
FIG. 2 is a schematic drawing illustrating one embodiment of heating elements for use in a cooking device according to the invention.
Figure 3:
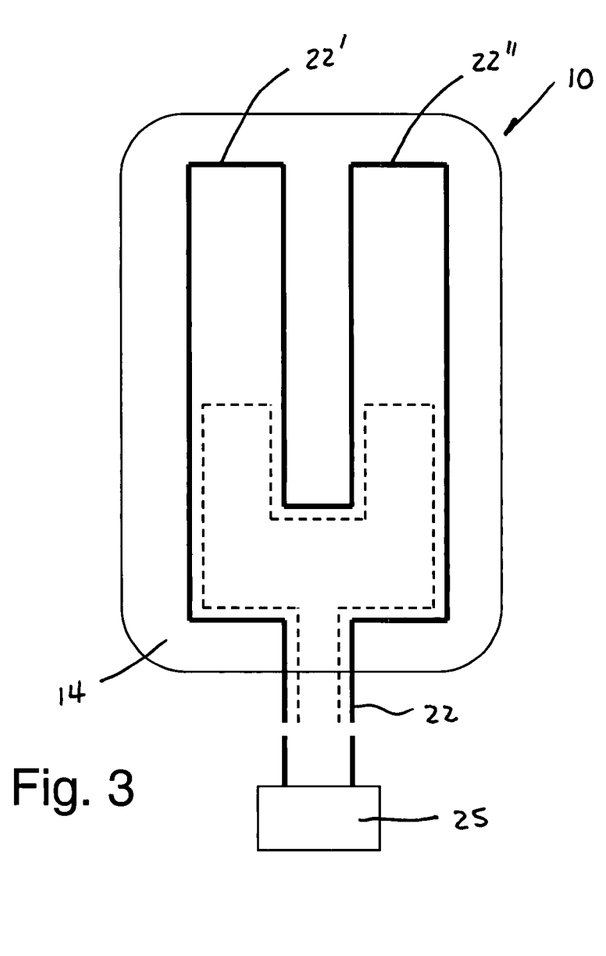
FIG. 3 is a schematic drawing illustrating one heating element shown in FIG. 2 energized.
Figure 4:
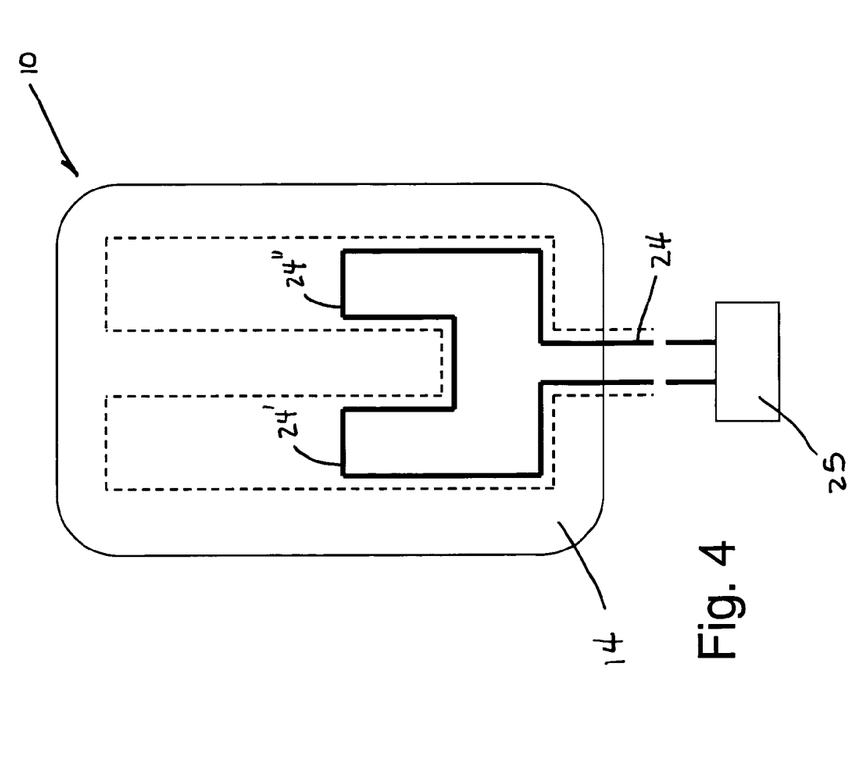
FIG. 4 is a schematic drawing illustrating the other heating element shown in FIG. 2 energized.

Turning to FIGS. 2-4 one embodiment of a variable power density indoor griddle 10 can be seen in schematic form. Cooking surface 14 can have a first heating element 22 and a second heating element 24. Heating element 22 can be generally U-shaped and can have two legs 22' and 22" that can be arranged to provide relatively uniform heating to cooking surface 14 when connected to an electrical outlet 25 and energized as illustrated in FIG. 3. Heating element 24 can be generally U-shaped and can have two legs 24' and 24" arranged to provide relatively uniform heating to a portion of cooking surface 14 when connected to an electrical outlet 25 and energized as illustrated in FIG. 4. Heating element 24 with legs 24' and 24" can be arranged so that legs 24' and 24" are positioned inside heating element 22 and legs 22' and 22". As illustrated in FIGS. 2-4 heating element 24 can be arranged to heat approximately one-half of cooking surface 14. Those skilled in the art that the portion of cooking surface 14 heated by heating element 24 can be more or less than one-half as desired. Heating elements 22 and 24 can be provided with connectors (not shown in FIGS. 2-4) to facilitate connection with a suitable temperature regulator.

Heating elements 22 and 24 can have the same impedance, or if desired, the impedance of heating element 24 can be greater or less than the impedance of heating element 22. When the impedance of heating elements 22 and 24 is similar the power density of heat applied to cooking surface 14 will be different depending on which heating element is energized. In the U.S. market 1500 watts can be applied to the full cooking surface 14 by energizing heating element 22 as in FIG. 3, or to a portion of the cooking surface 14 by energizing heating element 24. In this embodiment heating element 24 can heat approximately one-half of cooking surface 14 with a power density that is greater than the power density heating element 22 provides for the entire cooking surface 14. Similarly for griddles intended for 220/240 volt markets the maximum power (for example 2200 to 2500 watts) can be applied to the entire cooking surface or to a portion of the cooking surface.

Figures 6, 7, 8:
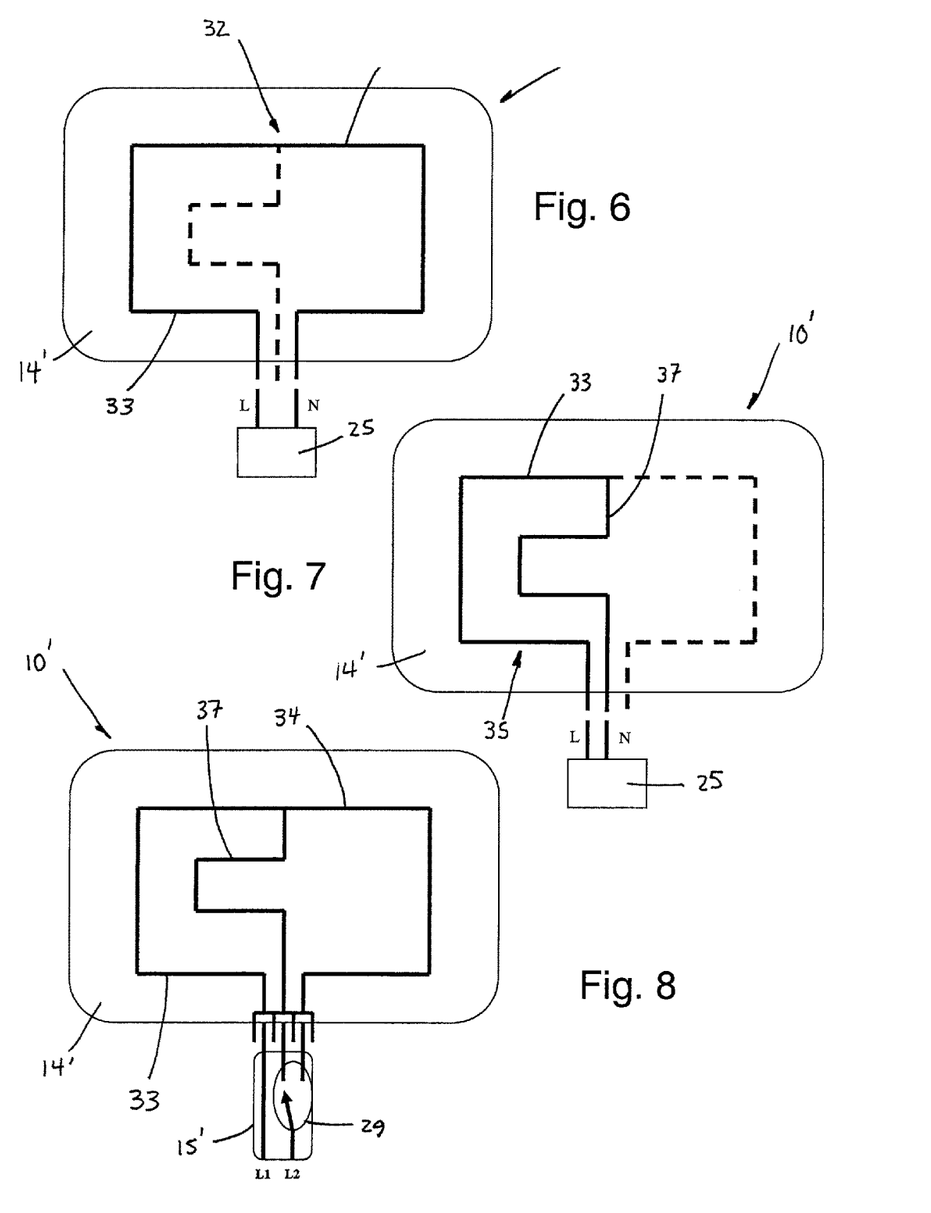
FIG. 6 is a schematic drawing illustrating another embodiment of heating elements for use in a cooking device according to the invention with one heating element energized.
FIG. 7 is a schematic drawing illustrating the other heating element shown in FIG. 6 energized.
FIG. 8 is a schematic drawing illustrating connection of a temperature regulator a cooking device shown in FIG. 6.

Turning to FIGS. 6-8 another embodiment of a variable power density indoor griddle 10' can be seen in schematic form. Cooking surface 14' can have a first heating element 32 formed of legs 33 and 34, as illustrated in FIG. 6, that can be connected to an electrical outlet 25. Cooking surface 14' can have a second heating element 35 formed of legs 33 and 37, as illustrated in FIG. 7, that can be connected to an electrical outlet 25. Griddle 10' illustrated in FIGS. 6-8 can include a temperature regulator 15'. Temperature regulator 15' can include a switch 29 that can alternately connect legs 33 and 34 (first heating element 32) or can connect legs 33 and 37 (second heating element 35) to an electrical outlet (not shown in FIG. 8). Those skilled in the art will understand that temperature regulator 15' can include a temperature probe and user adjustable temperature selector (not shown) as are well known in the art.

The first heating element 32 (legs 33 and 34) can be arranged to heat cooking surface 14' at a first power density. The second heating element 35 (legs 33 and 37) can be arranged to heat a portion of cooking surface 14' at a second power density. When the first and second heating elements 32 and 35 have substantially the same impedance the second power density in the portion of cooking surface 14' heated by second heating element 35 is greater than the first power density in cooking surface 14' when the first heating element 32 is energized. As described in connection with the embodiment of FIGS. 2-4 the impedance of the second heating element (legs 33 and 37) can be greater of less than the impedance of the first heating element (legs 33 and 34). Similarly the portion of cooking surface 14' heated by the second heating element (legs 33 and 37) can be more or less than one-half of the total cooking surface as desired. By adjusting the impedance of the first and second heating elements and the portion of the cooking surface heated by the second heating element the second power density can be adjusted to match desired operating parameters.

Figure 9:
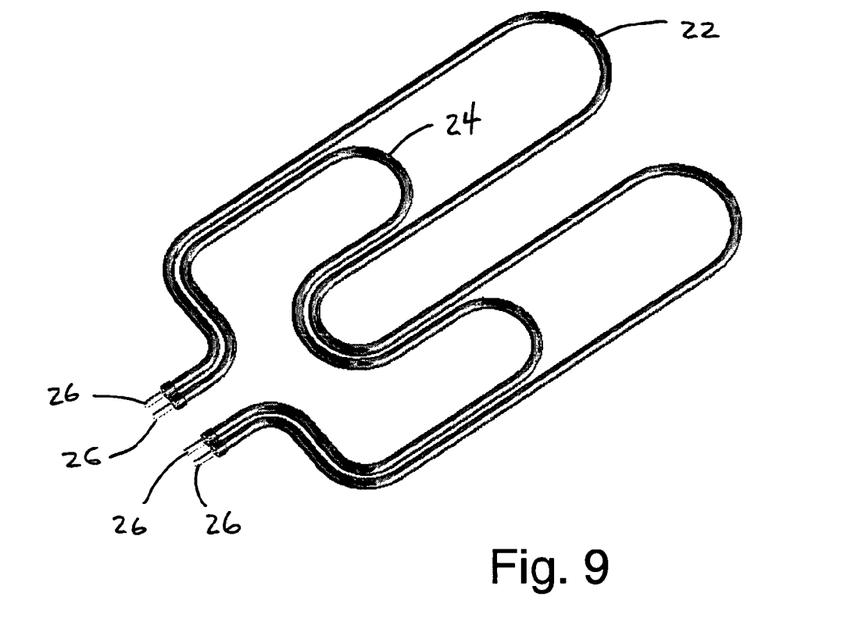
FIG. 9 is a perspective view of heating elements illustrated in the embodiment of FIG. 2.
Figure 10:
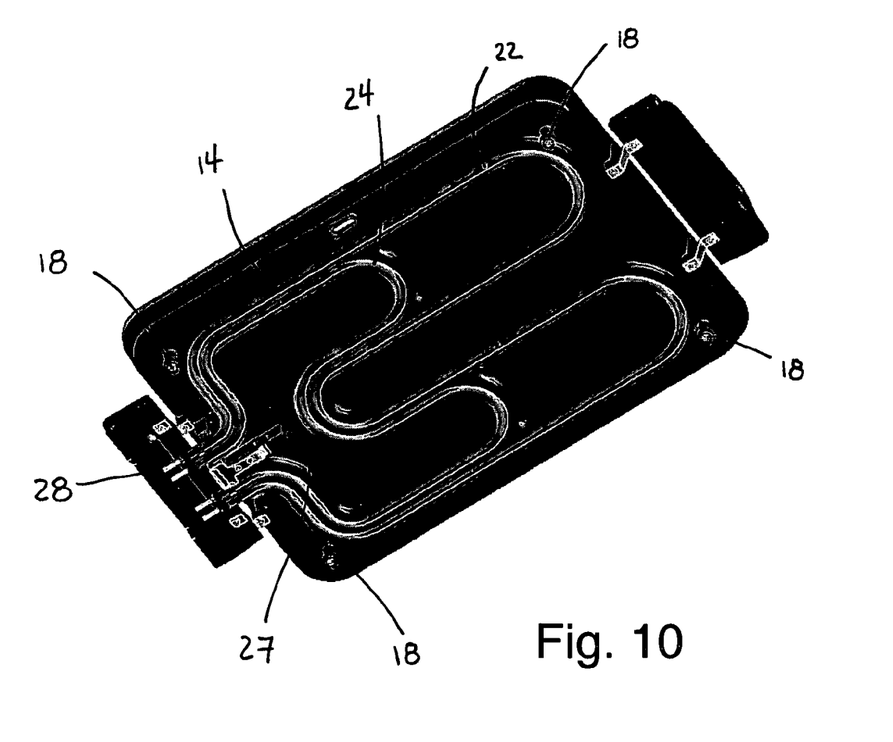
FIG. 10 is a bottom perspective view the heating elements of FIG. 8 installed on a cooking surface.

Turning to FIGS. 9 and 10 heating elements 22 and 24 of the embodiment illustrated in FIGS. 2-4 can be seen. Referring to FIG. 9 each heating element can end in terminals 26 that can be arranged to connect to a temperature regulator. In the embodiment illustrated in FIGS. 9 and 10 heating elements 22 and 24 can be mounted to the cooking surface 14 by clipping, crimping or pressing the heating elements in place as is well known in the art. Alternately, heating elements can be cast in place in cooking surface 14 (not shown) as is also well known in the art. Cooking surface 14 can include a plurality of supports 18 that can be arranged to support cooking surface 14 on a base 11. Alternately supports 18 can be provided with suitable insulating feet (not shown) to support cooking surface 14 on a work surface without a base as is well known in the art.

Figure 11:
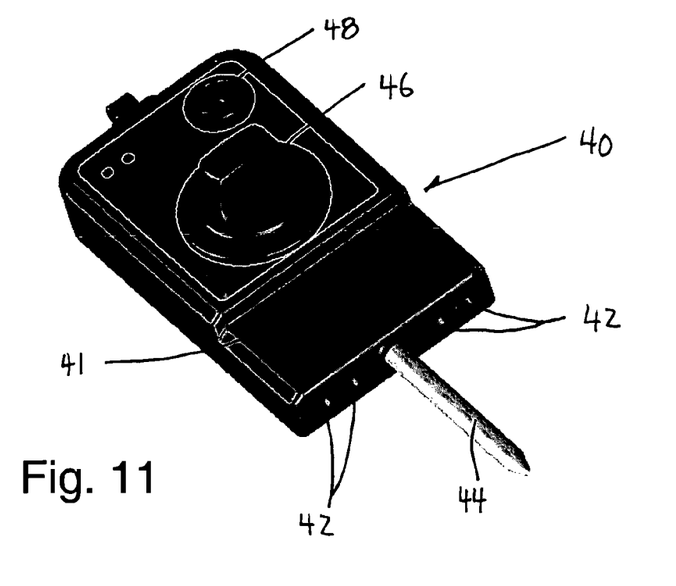
FIG. 11 is a perspective view of a temperature regulator arranged for use with a cooking appliance as shown n FIG. 2.

Turning to FIG. 11 a temperature regulator 40 that can be utilized with a griddle as illustrated in FIGS. 2-4 and 8-9 can be seen. Temperature regulator 40 can include a plurality of contacts 42 that can be arranged to receive terminals 26 of heating elements 22 and 24. Temperature regulator 40 can also include a temperature probe 44 that can be received in probe recess 27 in cooking surface 14 (see FIG. 10). Temperature regulator 40 can plug into cooking surface 14 with contacts 42 receiving terminals 26 and probe recess 27 receiving temperature probe 44 as is well known in the art. The housing 41 for temperature regulator 40 can be positioned below handle 28 connected to the cooking surface 14 (see FIG. 10). Temperature regulator 40 can have a selector knob 46 that can be arranged to adjust an adjustable thermostat (not shown) to allow a user to select a cooking temperature as is well known in the art. Temperature regulator 40 can also include a switch 48 that can alternately connect heating element 22 or heating element 24 though an adjustable thermostat (not shown) to a power source.

Thus, in operation a user can operate griddle 10 or 10' so that the first heating element 22 or 32 is energized through a temperature regulator 15' or 40 to heat the entire cooking surface 14 or 14' to a first power density. Alternately, the user can change the switch 29 or 48 so that the second heating element 24 or 35 is energized through the temperature regulator 15' or 40 to heat a portion of the cooking surface 14 or 14' to a second power density. The second heating element can be sized and arranged so that the second power density is greater than the first power density in order to brown or crisp food being cooked such as breakfast meats, French toast and hash browns. When the second heating element is energized the portion of the cooking surface that does not overlie the second heating element is not directly heated. However, food placed on the non-heated portion can remain warm by conduction of heat by the cooking surface while other foods are cooked on the heated portion. Applicants have found that the temperature of the surface of the cooking surface falls off quickly away from the second heating element allowing cooked foods to be kept warm without undue additional cooking. Those skilled in the art will understand that the higher power density can allow foods to cook faster and to brown the surface of the foods as the selected temperature is maintained more consistently and the cooking surface temperature recovers quicker when the power density is higher. Applicants have developed a heat recovery test to measure the performance of a cooking surface provided with higher power density portion. The heat recovery test results parallel observed improvements in cooking times for foods such as hash brown potatoes and bacon. To conduct the heat recovery test a cooking surface is heated to a targeted temperature and a 1½ quart pan of ice water is placed on the cooking surface for one minute and removed. The time for the cooking surface to return to the target temperature (determined by when the thermostat opens) is recorded. The following table illustrates the improved heat recovery time for a cooking surface having a high power density mode of operation according to the invention:

| Mode of Operation | Time for Thermostat to Open |
| --- | --- |
| Full Surface Element | 2:25 Minutes |
| Partial Surface Element | 1:20 Minutes |

In one embodiment of a griddle for the U.S. market the first and second heating elements can each be approximately 9 ohms so that approximately 1500 watts can be applied either to the entire cooking surface or to a portion of the cooking surface depending on the selection made by the user. Typical indoor electric griddles can have a cooking surface on the order of 14"×24" to provide ample space for cooking foods such as pancakes, eggs and the like. By providing such a griddle with variable power density heating elements according to the invention a griddle with a large cooking surface can also provide satisfactory cooking of foods that require higher power density than typically available in large indoor griddles designed for normal household electric service.

Figure 12:
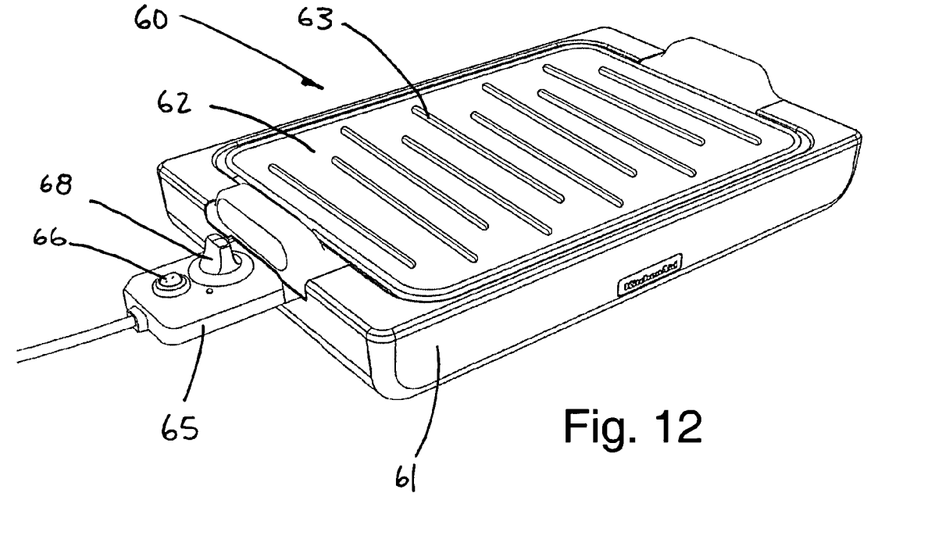
FIG. 12 is a perspective view of another embodiment of an electric cooking appliance according to the invention.
Figure 13:
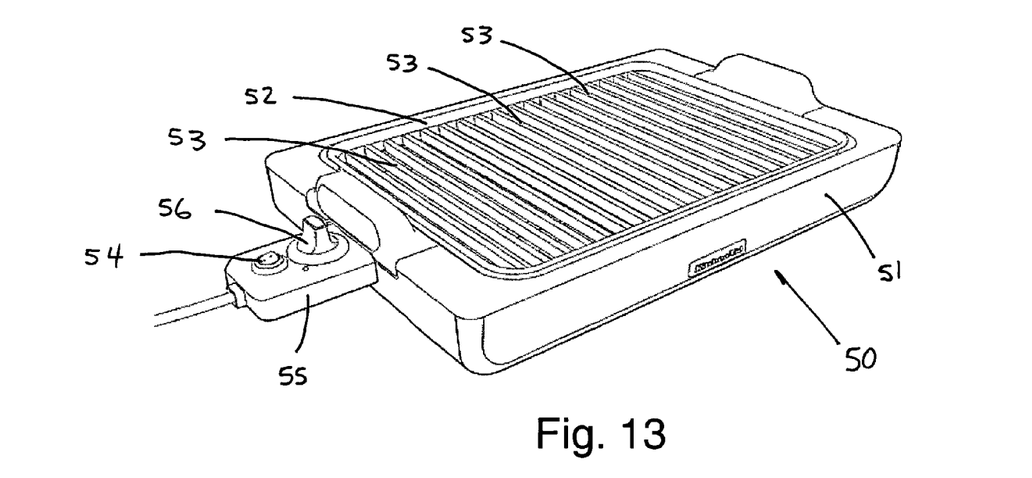
FIG. 13 is a perspective view of another embodiment of an electric cooking appliance according to the invention.

Turning to FIGS. 12 and 13 grill embodiments of the invention can be seen. Referring to FIG. 12, indoor electric grill 60 can include a base 61 that can be arranged to support grill 62 that can be a cooking surface having a plurality of ribs 63 formed on the top surface. While the embodiment shown in FIG. 12 includes ribs 63 over substantially the entire surface of the grill, those skilled in the art with understand that ribs can be provided over only a portion of the grill 62 if desired. Those skilled in the art will understand that grill 62 can be a die-cast cooking surface similar to cooking surface 14 but provided with a plurality of ribs 63. While grill 63 can be a die-cast aluminum those skilled in the art will understand that other thermally conductive plates having ribs can be used. Grill 62 can be provided with first and second heating elements (not shown) similar to the heating elements for the griddles illustrated in FIGS. 2-4 or FIGS. 6-8. As will be understood by those skilled in the art the heating elements can be clipped, crimped or molded into grill 62. Those skilled in the art will also understand that grill 62 can be reversible with a generally flat griddle on one side and a ribbed or partially ribbed surface on the other side to provide the user with a choice of cooking surface depending on the food being cooked. Electric grill 60 can also include a temperature regulator 65 that can include a switch 66 to connect the first or second heating element to the temperature controller as described above. Temperature regulator 65 can also have a control knob 68 for adjusting the temperature controller as is well known in the art. Thus, electric grill 60 can be arranged to cook foods employing two different power densities. When the first heating element (not shown) arranged to heat the entire grill is energized foods can be cooked on the grill at a first power density. When the second heating element (not shown) arranged to heat a portion of the grill is energized foods can be cooked on that portion of the grill heated by the second heating element at a second power density. As in the case of the griddle embodiments described above, the impedance of the first and second heating elements can be different or can be approximately the same. As in the case of the griddle embodiments described above, the heat recovery time, and accordingly the cooking time, for the second power density on a portion of the grill can be significantly quicker than the first power density over the entire grill.

Turning to FIG. 13 another grill embodiment can be seen. Referring to FIG. 13 an indoor electric grill 50 can be seen. Electric grill 50 can include a base 51 that can be arranged to support a grill 52 that can comprise a plurality of bars 53 that can be arranged to support food for grilling. Grill 52 can formed of discrete bars 53 formed and fastened together or can be die-cast as is well known in the art. First and second heating elements similar to the heating elements described above in connection with FIGS. 2-4 or FIGS. 6-8 can be provided for grill 52. As will be understood by those skilled in the art the heating elements can be clipped or crimped to the grill 52. Electric grill 50 can also include a temperature regulator 55 that can include a switch 54 to connect the first or second heating element to the temperature controller as described above. Temperature regulator 55 can also have a control knob 56 for adjusting the temperature controller as is well known in the art. Thus, electric grill 50 can be arranged to cook foods employing two different power densities. When the first heating element (not shown) arranged to heat the entire grill is energized foods can be cooked on the grill at a first power density. When the second heating element (not shown) arranged to heat a portion of the grill is energized foods can be cooked on that portion of the grill heated by the second heating element at a second power density. As in the case of the griddle embodiments described above, the impedance of the first and second heating elements can be different or, can be approximately the same. As in the case of the griddle embodiments described above, the cooking time for the second power density on a portion of the grill can be significantly quicker than the first power density over the entire grill.

The electric griddle and grill embodiments described above can include a base arranged to support the griddle or grill in operation. Those skilled in the art will understand that the base can be eliminated if desired and the griddle or grill can be provided with suitable insulating legs (not shown) as is well known in the art. In the case of an electric grill having open spaces between bars on the grill surface between the bars or ribs can be provided with a suitable pan or tray for catching grease as is well known in the art.

While the invention has been specifically described in connection with certain specific embodiments thereof, it is to be understood that this is by way of illustration and not of limitation, and the scope of the appended claims should be construed as broadly as the prior art will permit.

We claim:

1. A portable electric cooking device arranged to operate at a predetermined maximum power input comprising:
   a cooking surface;
   a first heating element arranged for relatively uniform heating of substantially the entire cooking surface with a first power density;
   a second heating element arranged for relatively uniform heating of a portion of the cooking surface with a second power density; and
   a selector connected to the first heating element and the second heating element arranged to selectively connect either the first heating element or the second heating element to an electrical outlet wherein substantially the predetermined maximum power input to the cooking device is either applied over substantially the entire cooking surface when the first heating element is connected or is applied over a portion of the cooking surface when the second heating element is connected.

2. The portable electric cooking device according to claim 1, wherein the second power density is different than the first power density.

3. The portable electric cooking device according to claim 2, wherein the second power density is greater than the first power density.

4. The portable electric cooking device according to claim 1, wherein the impedance of the second heating element is different than the impedance of the first heating element.

5. The portable electric cooking device according to claim 1, wherein the impedance of the second heating element is substantially the same as the impedance of the first heating element.

6. The portable electric cooking device according to claim 1, wherein the impedance of the first heating element and the impedance of the second heating element are sized to allow operation of the electric cooking device connected to a normal household electric circuit.

7. The portable electric cooking device according to claim 1, wherein the second heating element includes a portion of the first heating element.

8. The portable electric cooking device according to claim 1, wherein the first heating element comprises a first leg arranged for heating a first portion of the cooking surface and a second leg arranged for heating a second portion of the cooking surface.

9. The portable electric cooking device according to claim 8, wherein the second heating element comprises the first leg of the first heating element and a third leg arranged for heating the first portion of the cooking surface.

10. The portable electric cooking device according to claim 9, wherein the selector is arranged to connect the first leg and the second leg to the power source in first setting and to connect the first leg and the third leg to the power source in a second setting.

11. The portable electric cooking device according to claim 1, wherein the first heating element and the second heating element are discrete.

12. The portable electric cooking device of claim 11, wherein cooking device is generally rectangular having a long dimension and the first heating element is generally U-shaped comprising first and second legs.

13. The portable electric cooking device of claim 12, wherein the first and second legs are arranged along the long dimension of the cooking surface.

14. The portable electric cooking device of claim 13, wherein the second heating element is generally U-shaped comprising first and second legs.

15. The portable electric cooking device of claim 14, wherein second heating element first and second legs are arranged along a portion of the long dimension of the cooking surface.

16. The portable electric cooking device of claim 14, wherein the second heating element first and second legs are arranged along a portion of the long dimension of the cooking surface within the first and second legs of the first heating element.

17. The portable electric cooking device according to claim 1, further including a temperature regulator connected to the selector.

18. The portable electric cooking device according to claim 17, wherein the temperature regulator includes a temperature probe and an adjustable thermostat with an ON/OFF control.

19. The portable electric cooking device according to claim 18, wherein the selector is a two position switch connected with the temperature regulator wherein the temperature regulator controls the temperature of the one of the first heating element and the second heating element energized by the selector.

20. The portable electric cooking device according to claim 1, wherein the cooking surface comprises a substantially flat cooking surface.

21. The portable electric cooking device according to claim 1, wherein the cooking surface comprises a grill having spaced apart bars.

22. The portable electric cooking device according to claim 1, wherein the cooking surface comprises a ribbed cooking surface.

23. A portable electric griddle comprising:
   a substantially flat rectangular aluminum cooking surface;
   a first heating element positioned under the cooking surface and arranged to provide relatively uniform heat to substantially the entire cooking surface with a first power density;
   a second heating element positioned under a portion of the cooking surface and arranged to provide relatively uniform heat to approximately half of the cooking surface with a second power density that is greater than the first power density;
   a temperature regulator; and
   a selector connected to the first heating element and the second heating element arranged to selectively connect either the first heating element or the second heating element through the temperature regulator to a power source whereby substantially the same predetermined maximum power input is applied to the griddle whether the first heating element or the second heating element is connected.

24. The portable electric griddle according to claim 23, wherein the temperature regulator includes a temperature probe and an adjustable thermostat with an ON/OFF control.

25. The portable electric griddle according to claim 24, wherein the selector is a two position switch connected with the temperature regulator wherein the temperature regulator controls the temperature of the one of the first heating element and the second heating element energized by the selector.

26. A portable electric cooking device arranged to operate at a predetermined maximum power input comprising:
- a cooking surface;
- first means for providing relatively uniform heating to substantially the entire cooking surface with a first power density;
- second means for providing relatively uniform heating to a portion of the cooking surface with a second power density;
- means for selectively connecting either the first means or the second means to an electrical outlet;
- wherein the second power density is greater than the first power density; and
- wherein substantially the predetermined maximum power input to the cooking device is either applied over substantially the entire cooking surface when the first means is connected or over the portion of the cooking surface when the second means is connected.

27. A portable electric cooking device comprising:
- a cooking surface;
- a first heating element arranged for relatively uniform cooking of food on substantially the entire cooking surface with a first power density;
- a second heating element arranged for relatively uniform cooking of food on approximately one-half of the cooking surface with a second higher power density; and
- a selector connected to the first heating element and the second heating element arranged to selectively connect either the first heating element or the second heating element to an electrical outlet whereby substantially the same predetermined maximum power input is applied to the cooking device whether the first heating element or the second heating element is connected.

28. The portable electric cooking device according to claim 27 wherein food placed on the non-heated approximately one-half of the cooking surface when the second heating element is connected to an electrical outlet is warmed by conduction of heat from the heated portion by the cooking surface.

29. A portable electric cooking device comprising:
- a substantially flat generally rectangular metal cooking surface having a long dimension;
- a first generally U-shaped heating element comprising first and second legs arranged along a substantial portion of the long dimension of the cooking surface to provide relatively uniform heating to the entire cooking surface;
- a second generally U-shaped heating element comprising first and second legs positioned inside the first and second legs of the first generally U-shaped heating element along approximately one-half of the long dimension of the generally rectangular cooking surface and arranged to provide relatively uniform heating to approximately one-half of the cooking surface;
- a temperature regulator; and
- a selector connected to the first heating element and the second heating element arranged to selectively connect either the first heating element or the second heating element through the temperature regulator to an electrical outlet whereby substantially the same predetermined maximum power input is applied to the cooking device whether the first heating element or the second heating element is connected.

* * * * *